United States Patent [19]
Wellman et al.

[11] Patent Number: 5,207,150
[45] Date of Patent: May 4, 1993

[54] BAKING TRAY APPARATUS

[76] Inventors: Leo F. Wellman; Dorothy L. Wellman, both of 4139 Walnuthaven Dr., Covina, Calif. 91722

[21] Appl. No.: 886,598
[22] Filed: May 21, 1992
[51] Int. Cl.⁵ .................................................. A47J 37/01
[52] U.S. Cl. ...................................... 99/439; 99/345; 99/428; 249/120; 249/122
[58] Field of Search ................. 99/345, 426, 428, 432, 99/433, 439; 211/74; 220/23.4, 23.83, 23.86, 912; 249/119, 120, 122; 425/412

[56]                 References Cited
                U.S. PATENT DOCUMENTS

| Re. 1,561 | 11/1863 | Havemayer et al. | 249/120 |
|---|---|---|---|
| 451,166 | 4/1891 | Bryant | 249/120 |
| 1,831,047 | 11/1931 | Thomas | 249/120 |
| 1,873,081 | 8/1932 | Von Witzki | 249/120 |
| 1,992,712 | 2/1935 | Mojonnier | 249/120 |
| 2,046,864 | 7/1936 | Baker | 211/74 |
| 2,411,193 | 11/1946 | Cummins | 249/119 |
| 3,154,209 | 10/1964 | Wilhite et al. | 211/74 |
| 3,379,120 | 4/1968 | Fogle | 99/439 |
| 3,951,259 | 4/1976 | Oglesbee | 220/23.83 |
| 4,067,538 | 1/1978 | Doherty | 249/119 |
| 4,812,323 | 3/1989 | Savage | 249/122 |

FOREIGN PATENT DOCUMENTS

| 1141774 | 9/1957 | France | 249/120 |
|---|---|---|---|
| 1351218 | 12/1963 | France | 211/74 |
| 729353 | 12/1971 | Italy | 249/120 |
| 165107 | 1/1934 | Switzerland | 220/23.86 |

Primary Examiner—Harvey C. Hornsby
Assistant Examiner—Mark Spisich

[57]                    ABSTRACT

A baking tray includes an upper plate spaced from a lower plate, with the upper plate including a plurality of spaced apertures coaxially aligned with cylindrical recesses of the lower plate. A modification of the invention includes insert structure arranged for baking of shells for accommodating baked goods therewithin.

1 Claim, 4 Drawing Sheets

BAKING TRAY APPARATUS

BACKGROUND OF THE INVENTION

1. Field of the Invention

The field of invention relates to baking apparatus, and more particularly pertains to a new and improved baking tray apparatus wherein the same is arranged for the convenience of the baking and preparation of various baked products.

2. Description of the Prior Art

To minimize waste and effort in the preparation and subsequent cleaning of various components in a baking procedure, the instant invention attempts to overcome deficiencies of the prior art by providing for an upper tray spaced from a lower tray to accommodate ice cream type shells, where the shells are arranged for the filling with various ingredients to effect a final product to permit removing of the shell and the contents of the shell as a unitary baked component for subsequent consumption. A modification of the invention includes structure for the baking of such shell components as desired.

Prior art structure directed to the baking of various components such as breads and the like are set forth in the U.S. Pat. Nos. 3,518,091; 4,583,955; Des. 257,817.

Accordingly, it may be appreciated that there continues to be a need for a new and improved baking tray apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of baking tray now present in the prior art, the present invention provides a baking tray apparatus wherein the same utilizes spaced plate members arranged to secure conical shells in a vertical orientation therebetween for the reception of various baking dough within the shells. As such, the general purpose of the present invention, which will be described subsequently in greater detail, is to provide a new and improved baking tray apparatus which has all the advantages of the prior art baking tray apparatus and none of the disadvantages.

To attain this, the present invention provides a baking tray including an upper plate spaced from a lower plate, with the upper plate including a plurality of spaced apertures coaxially aligned with cylindrical recesses of the lower plate. A modification of the invention includes insert structure arranged for baking of shells for accommodating baked goods therewithin.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved baking tray apparatus which has all the advantages of the prior art baking tray apparatus and none of the disadvantages.

It is another object of the present invention to provide a new and improved baking tray apparatus which may be easily and efficiently manufactured and marketed.

It is a further object of the present invention to provide a new and improved baking tray apparatus which is of a durable and reliable construction.

An even further object of the present invention is to provide a new and improved baking tray apparatus which is susceptible of a low cost of manufacture with regard to both materials and labor, and which accordingly is then susceptible of low prices of sale to the consuming public, thereby making such baking tray apparatus economically available to the buying public.

Still yet another object of the present invention is to provide a new and improved baking tray apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
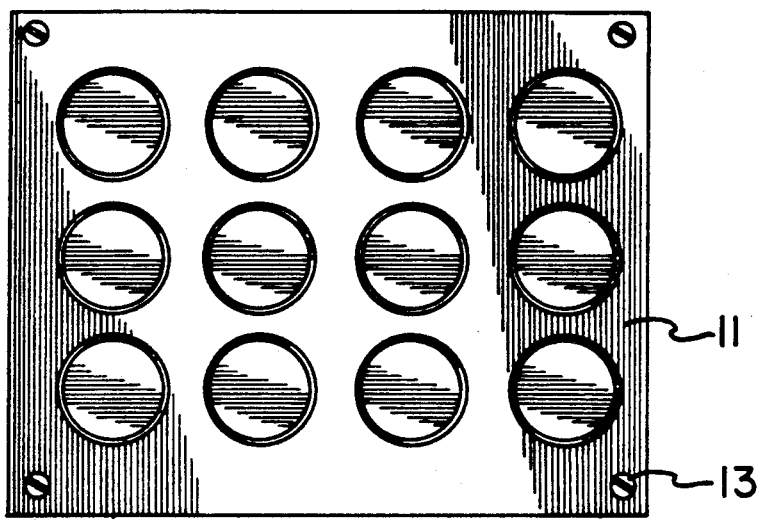
FIG. 1 is an orthographic top view of the instant invention.

With reference now to the drawings, and in particular to FIGS. 1 to 9 thereof, a new and improved baking tray apparatus embodying the principles and concepts of the present invention and generally designated by the reference numeral 10 will be described.

More specifically, the baking tray apparatus 10 of the instant invention essentially comprises an upper plate 11 of a planar construction arranged in a parallel, coextensive, and spaced relationship relative to a lower plate 12 spaced apart a predetermined first height. Support posts 13 spaced orthogonally between the upper and lower plates 11 and 12 in a fixed relationship about the periphery of the upper and lower plates maintain the upper and lower plates in a predetermined spaced relationship. The upper plate 11 includes a matrix of upper plate bores 14 and the lower plate 12 including a matrix of lower plate cylindrical recesses 15, with each of said upper plate bores 14 coaxially aligned with one of said lower plate cylindrical recesses 15, with the bores 14 and recesses 15 each defined by an equal predetermined diameter.

In this manner, various shells such as ice cream cones and the like may be directed through the upper plate bores 14 and received within the recesses 15 to receive various baking components therewithin, wherein the baking components upon baking of such an organization are removed for subsequent consumption as a unitary product requiring a minimum of maintenance and cleaning of the upper and lower plate structure.

Figure 2:
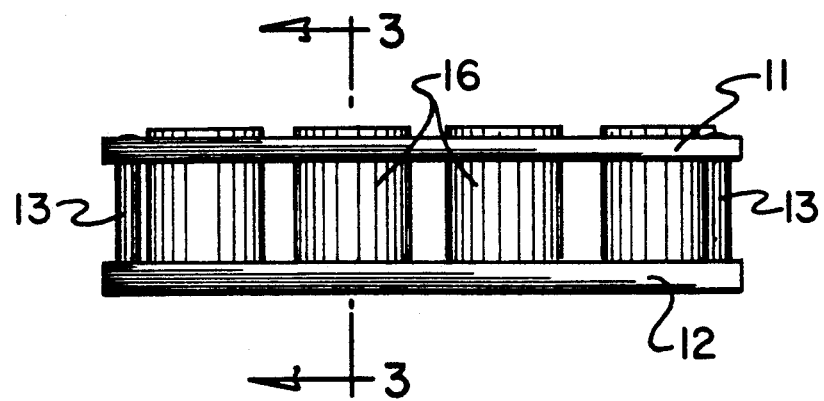
FIG. 2 is an orthographic side view of the instant invention.
Figure 3:
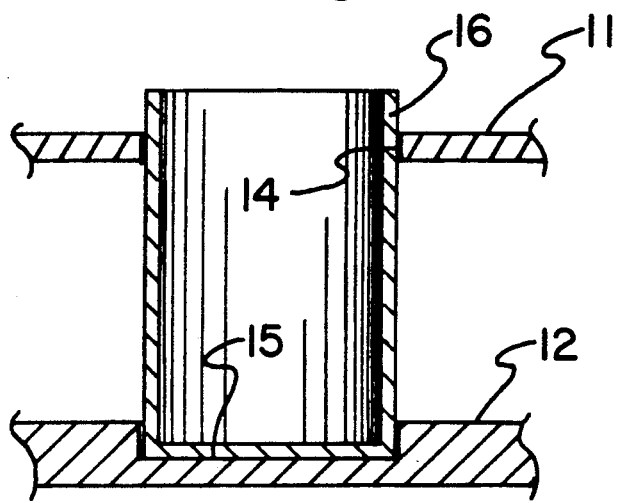
FIG. 3 is an orthographic view, taken along the lines 3—3 of FIG. 2 in the direction indicated by the arrows.
Figure 4:
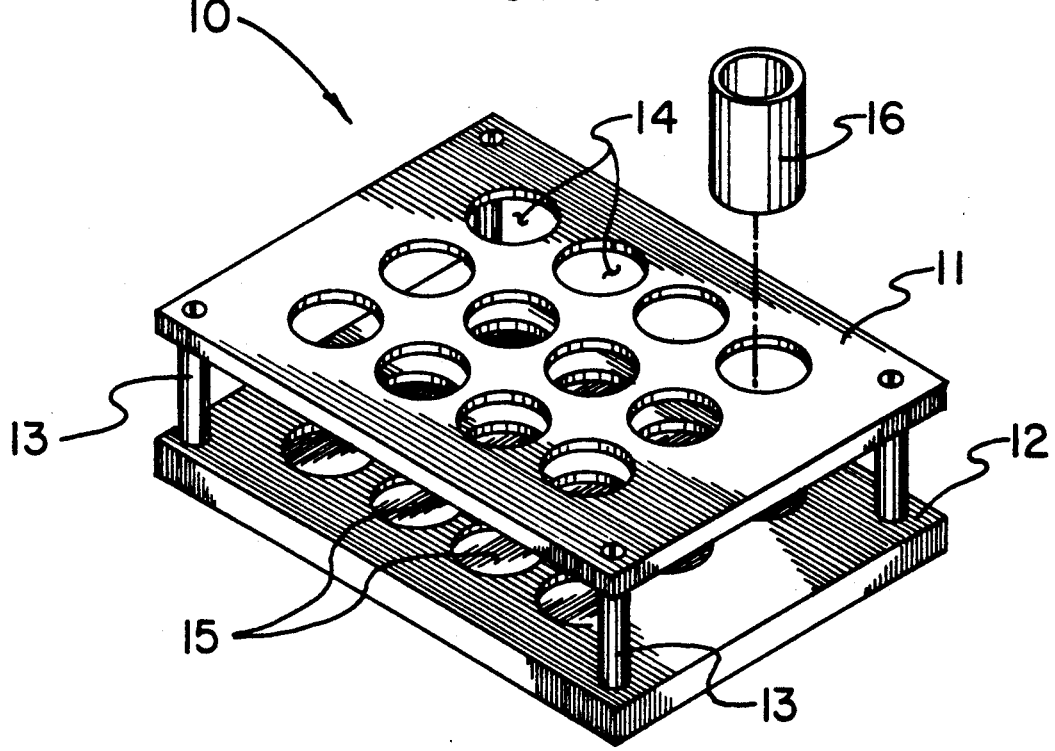
FIG. 4 is an isometric illustration of the invention employing the removal of baking containers.
Figure 5:
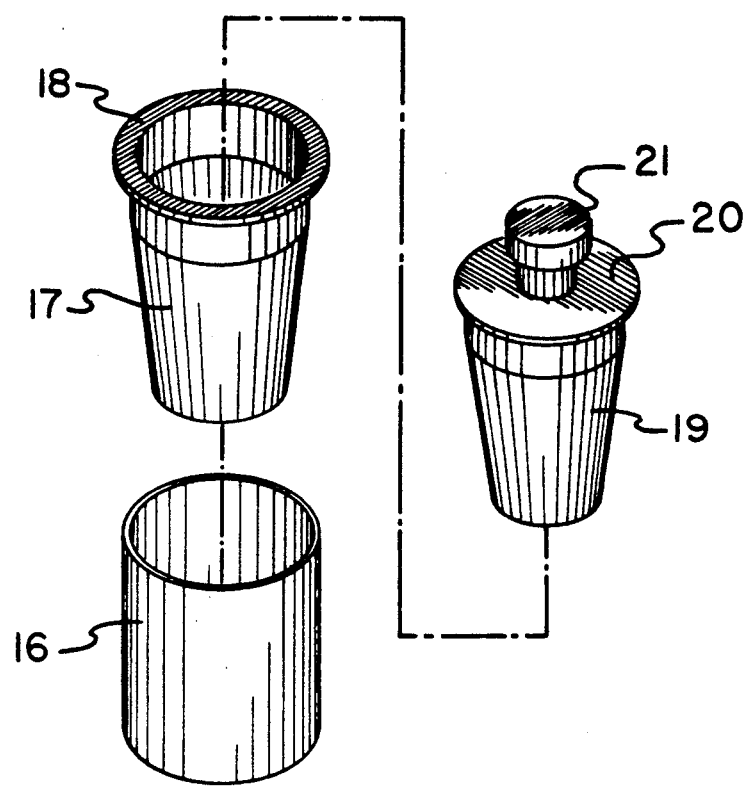
FIG. 5 is an isometric illustration of a modified baking container structure.
Figure 6:
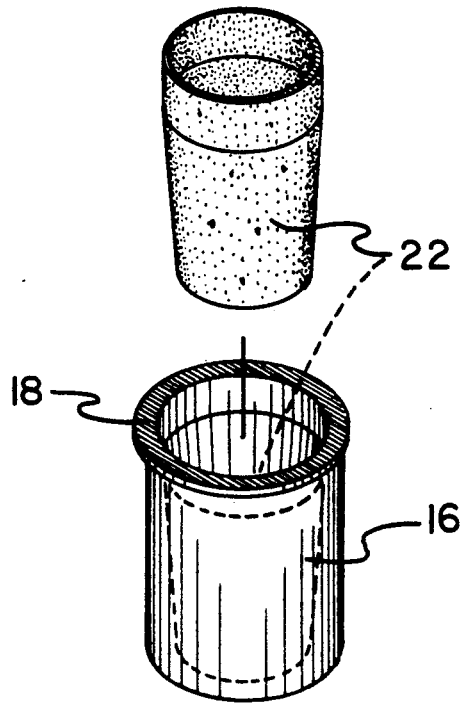
FIG. 6 is an isometric illustration of the product associated with a baking container organization.
Figure 7:
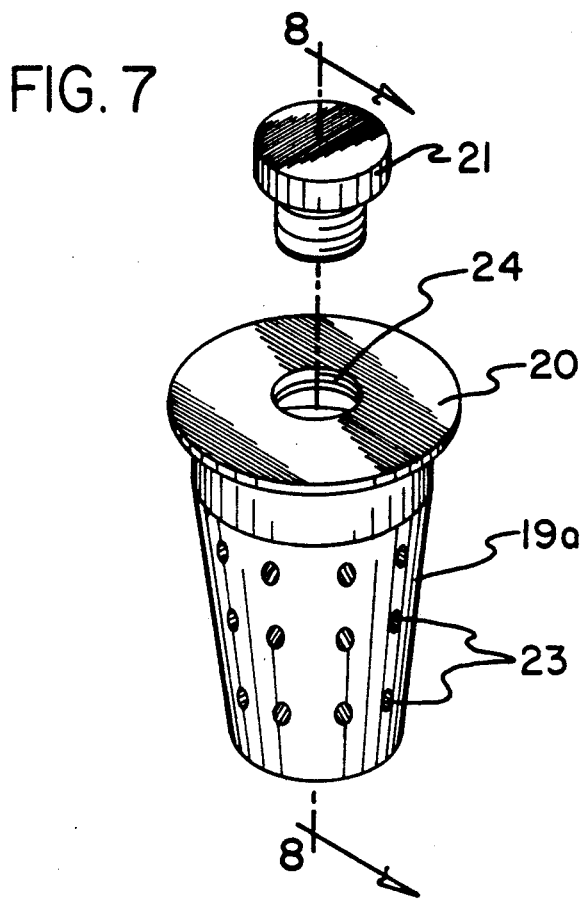
FIG. 7 is an isometric illustration of a modified insert container to be utilized with the baking structure, as illustrated in FIG. 5.
Figure 9:
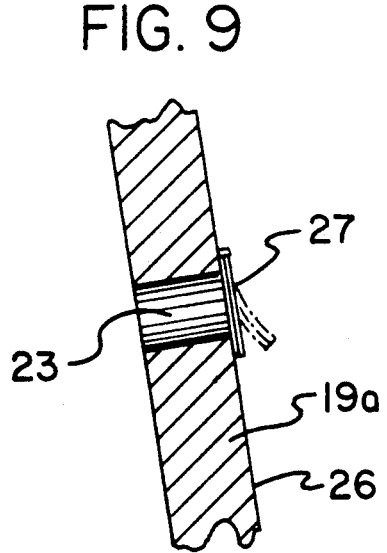
FIG. 9 is an orthographic enlarged view of section 9 as set forth in FIG. 8.
Figure 8:
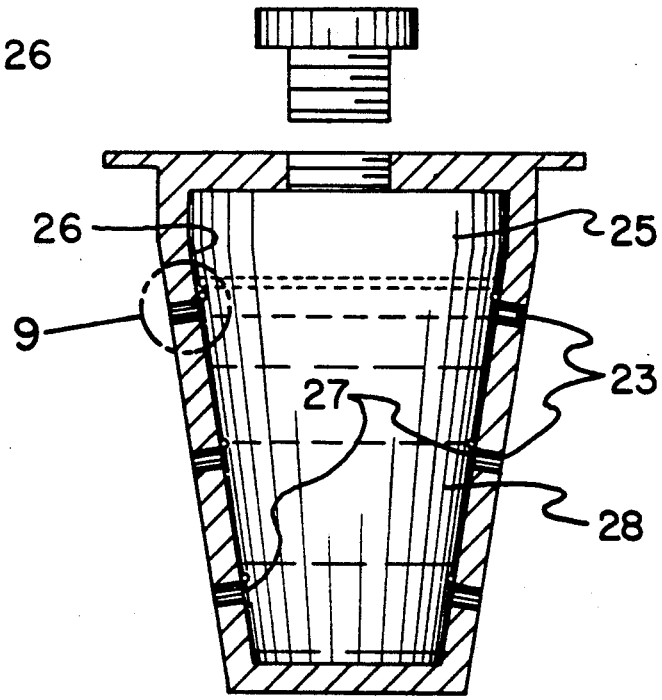
FIG. 8 is an orthographic view, taken along the lines 8—8 of FIG. 7 in the direction indicated by the arrows.

The apparatus as illustrated in the FIGS. 2 and 4 is provided with optional cylindrical containers 16 of a second height greater than the first height and of an outer diameter equal to or less than the predetermined diameter to permit complementary reception of the containers 16 within the bores and recesses, as illustrated in FIG. 3 for example. The cylindrical baking containers 16 are utilized for the baking of conical inserts, in manner for use as discussed above, and illustrated as the edible baked product 22 in FIG. 6. To permit the selective baking of such products 22, each cylindrical container 16 is directed through an aligned pair of a bore 14 and recess 15. A baking container first insert is of a height equal to the second height and has an upper flange 18 greater than the predetermined diameter to extend laterally beyond the upper terminal edge of the baking container 16 associated in a manner as illustrated in the FIGS. 5 and 6. A baking container second insert 19 is inserted coaxially aligned and within the baking container first insert 17 subsequent to the positioning of a cooking dough between the first and second inserts. The second insert includes a top wall 20 having a top wall handle 21, wherein in use in the modified insert 19a is threadedly removable relative to a top wall threaded bore 24 for access to insert container cavity 25 within the second insert 19. The modified insert 19a includes insert container side wall apertures 23 directed through coextensively through the side wall of the modified second insert 19a, wherein the insert container cavity is in communication with an interior wall surface 26. Each aperture 23 includes a bimetallic valve plate 27 overlying the aperture within the interior wall 26, whereupon heating within a baking environment effects displacement of the bimetallic strip 27, in a manner as illustrated in FIG. 9, to permit a fluid flavoring or dye 28 to selectively be directed through the bores 23 for communication with the edible product 22 during a baking procedure to meter such flavoring or coloring into the product in a selective manner and mere periodic replenishment of the fluid 28 is sufficient for repeated use of the modified second insert structure 19a in the baking of the products 22 for use as the shells for receiving a baking component, in a manner as discussed. above.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A baking tray apparatus, comprising, an upper plate of a planar construction spaced from, parallel to, and coextensive relative to a lower plate, and a plurality of support posts orthogonally and integrally mounted between the upper plate and the lower plate to maintain the upper plate spaced from the lower plate at a predetermined first height, and the upper plate including a matrix of upper plate bores, the lower plate including a plurality of lower plate cylindrical recesses directed into the lower plate, with the recesses arranged in confronting relationship relative to the upper plate, and each of said upper plate bores coaxially aligned with a respective one of said lower plate cylindrical recesses, and each upper plate bore and each lower plate recess is defined by a diameter equal to a predetermined diameter, and a plurality of cylindrical baking containers are provided and each of said plurality of baking containers is defined by a second height greater than the first height and equal to an outer diameter substantially equal to the predetermined diameter, and each baking container is received within the predetermined upper plate bore and an associated lower plate recess coaxially aligned with said predetermined upper plate bore, and a plurality of baking container first inserts defined by a container height equal to the second height, with each baking container first insert received within a respective one of said cylindrical baking containers, and each baking container first insert includes an upper flange defined by a flange diameter greater than the predetermined diameter to extend laterally beyond an upper terminal edge of said baking container receiving said baking container first insert, and at least one baking container second insert directed into said baking container first insert, wherein said baking container second insert includes a top wall, and a top wall bore, the top wall bore removably mounting a handle within said bore projecting above said top wall to define a spacing between said baking container second insert and said baking container first insert to direct a baking component between the baking container second insert and the baking container first insert, and wherein the baking container second insert includes a second insert side wall and the second insert side wall includes a matrix of side wall apertures, each side wall aperture is directed through said second insert side wall into communication with an insert container cavity within said second insert, and the second insert side wall includes an interior wall surface within said insert container cavity, and each side wall aperture includes a bimetallic valve plate positioned over said side wall aperture on said interior wall surface, with a fluid contained within said insert container cavity for selective metering through said baking container side wall upon displacement of said bimetallic valve plate relative to a respective insert container side wall aperture upon heating of said baking container second insert.

* * * * *